United States Patent

[11] 3,540,350

| [72] | Inventor | Victor H. C. Heine<br>Kalamazoo, Michigan |
|---|---|---|
| [21] | Appl. No. | 756,165 |
| [22] | Filed | Aug. 29, 1968 |
| [45] | Patented | Nov. 17, 1970 |
| [73] | Assignee | Pneumo Dynamics Corporation<br>Cleveland, Ohio<br>a corporation of Delaware |

[54] HYDROSTATIC CONTROL FAILURE DETECTION DEVICE
16 Claims, 4 Drawing Figs.

[52] U.S. Cl. .................................................. 91/360,
91/3, 91/363, 91/384, 91/411, 91/452; 92/76
[51] Int. Cl. ..................................................F15b 20/00,
F15b 13/08, F15b 9/10

[50] Field of Search............................................ 91/363A,
363, 411, 360, 3, 452Cursory, 384Cursory;
244/77Cursory; 92/7Cursory

[56] References Cited
UNITED STATES PATENTS
| 3,411,410 | 11/1968 | Westbury et al. ............ | 91/363A |
|---|---|---|---|
| 3,426,650 | 2/1969 | Jenny ........................... | 91/363A |

*Primary Examiner*—Paul E. Maslousky
*Attorney*—Stephen M. Mihaly

ABSTRACT: Hydrostatic control failure detection device includes plural channels each including a servoram driven by a torque motor, the output motion of all of the servorams being compared and monitored by comparator links which detect any failures in the channels and deactivate the servoram associated therewith to permit the other servorams to control unit output.

INVENTOR
VICTOR H. C. HEINE

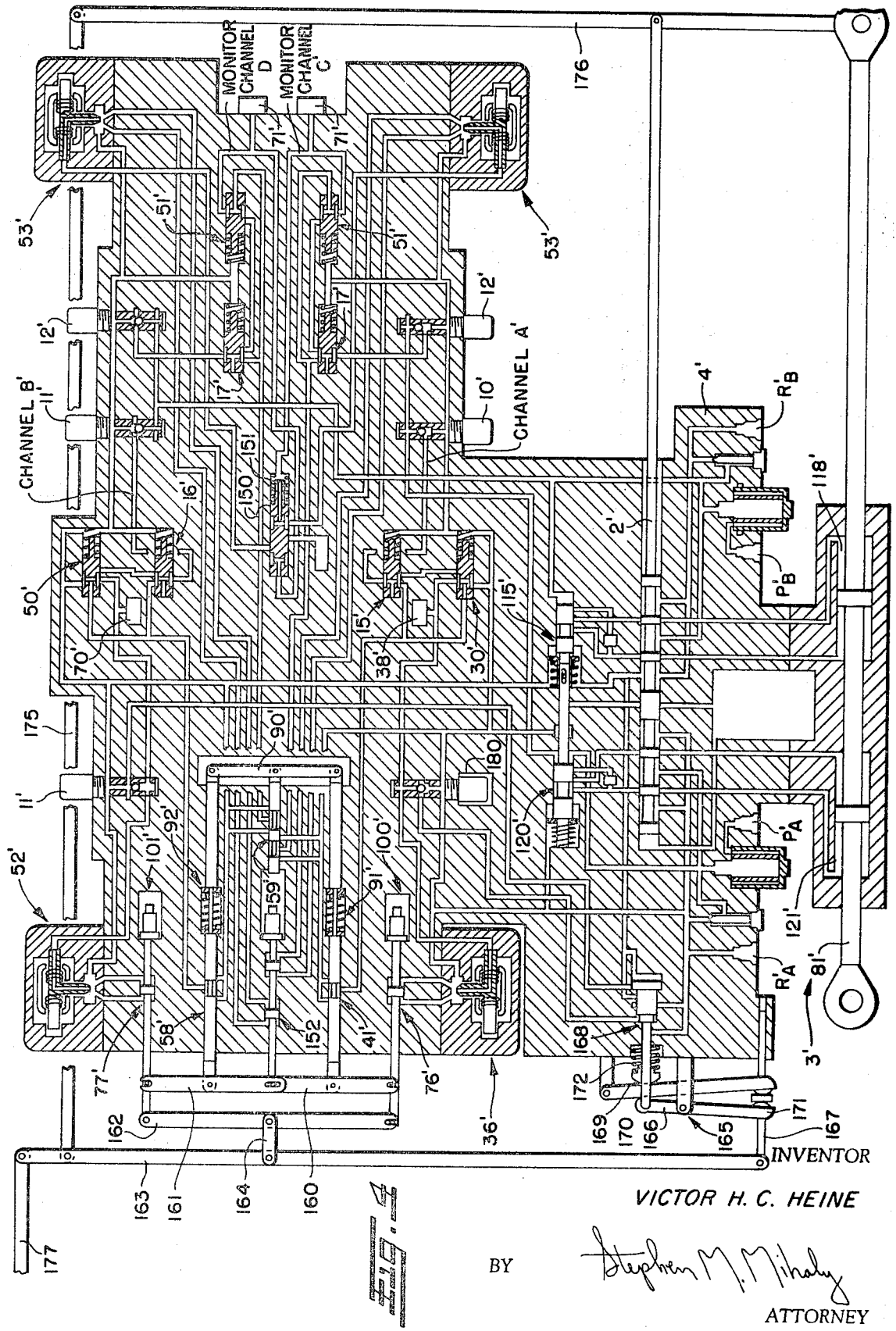

HYDROSTATIC CONTROL FAILURE DETECTION DEVICE

BACKGROUND OF THE INVENTION

This invention relates generally as indicated to a hydrostatic control failure detection device and more particularly to a multiredundant fluid control system for automatically detecting any hydrostatic, mechanical, or electrical failures within the system, rendering the failed portion of the system inoperative, and restoring the system to a position permitting continued operation by the remaining active portion of the system.

Multiredundant control systems are particularly important in the operation of the various flight control surfaces of aircraft, since otherwise a single failure in the system could be catastrophic. There are various ways in which redundant control has previously been accomplished, the most common of which has been to provide a standby control system which automatically assumes position control of the output when a failure is detected in the main control system. However, this means that during normal operation, the standby control system has no function whatsoever, and it is a very costly piece of equipment simply to be held in reserve.

In other redundant control systems, all of the fluid channels simultaneously supply fluid pressure to the same actuator except when a failure occurs in one of the channels, causing it to be deactivated, thus eliminating the above-mentioned drawback, but the controls which detect the failure and deactivate the defective channel are much more sophisticated and costly than has now found to be necessary.

SUMMARY OF THE INVENTION

With the foregoing in mind, it is a principal object of this invention to provide a hydrostatic control failure detection device generally of the type last described, but the controls for detecting a failure in a control channel and deactivating the servoram for that channel are much simpler and less costly than previous known controls and the movements of the deactivated servoram will be controlled by the remaining active servorams.

Another object is to provide such a control device in which substantially all of the major valve components for each channel may be identical in nature and of the simple on–off type, thus keeping original and repair costs down.

Still another object is to provide such a control device which is very reliable in operation, is not readily contaminated, and will not inadvertently shut off.

A further object is to provide such a control device in which failures in the separate channels are readily detected and deactivated, and after deactivation, such failed channels can be reactivated to ascertain whether or not the failure was only transient or has corrected itself.

These and other objects of the present invention may be achieved by providing a control device with plural separate fluid channels each including a servoram driven by a torque motor. The output motion of all of the servorams is compared and monitored by comparator links in such a manner that if any of the servoram movements do not agree with the others in direction, velocity, or magnitude, a detection valve associated with the defective channel is actuated to vent the associated torque motor and permit the other servorams to control the movements of the servoram in the defective channel.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 4 is a schematic diagram of yet another form of hydrostatic control failure detection device in accordance with this invention.

DESCRIPTION OF THE PREFERRED EMBODIMENTS

Figure 1:
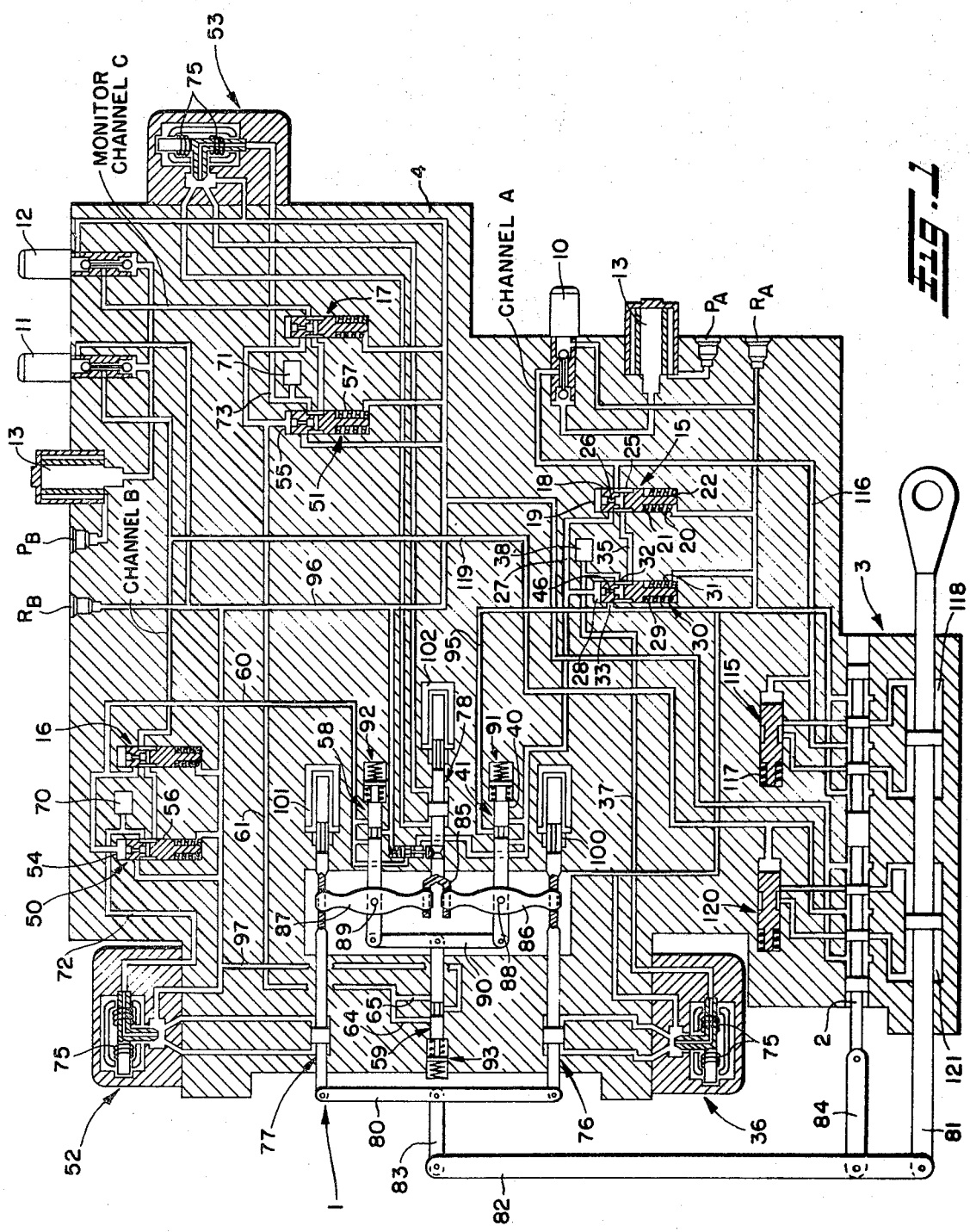
FIG. 1 is a schematic diagram of a preferred form of hydrostatic control failure detection device constructed in accordance with this invention.

Referring now in detail to the drawings and first especially to FIG. 1, a preferred form of hydrostatic control failure detection device 1 in accordance with this invention is shown operatively connected to the main servovalve plunger 2 of a flight control actuator 3 or the like for controlling the movements thereof, in a manner to be subsequently fully explained. The hydrostatic control failure detection device 1, which may be of modular configuration, is comprised of at least three separate fluid channels A, B, and C desirably pressurized by at least two separate hydraulic sources, one adapted to be operatively connected to the pressure and return ports $P_A$ and $R_A$ in the housing 4 and the other adapted to be connected to the pressure and return ports $P_B$ and $R_B$. In the embodiment illustrated in FIG. 1, pressure and return ports $P_A$ and $R_A$ are associated with the channel A, whereas the pressure and return ports $P_B$ and $R_B$ are associated with channel B and monitor channel C. However, it should be understood that a separate fluid source could also be provided for pressurizing channel C, if desired.

Within the channels A, B, and C there is provided an engage solenoid valve 10, 11, and 12 to which fluid entering the pressure ports $P_A$ and $P_B$ is supplied after flowing through filters 13 and 14. Associated with each of the solenoid valves 10, 11, and 12 in the respective channels A, B, and C are engage valves 15, 16, and 17 to which fluid is supplied when the solenoid valves are energized as shown in FIG. 1, but when the solenoid valves are deenergized fluid flow from the pressure ports is blocked thereby and the engage valves are connected to the return ports $R_A$ and $R_B$ through the associated solenoid valves. Each of the engage valves 15, 16, and 17 is desirably of identical construction and operates in the same manner and accordingly a description of the engage valve 15 will suffice for all of them.

The engage valve 15 is axially movable in a bore 18 in the housing 4, normally biased into engagement with one end 19 by a spring 20 disposed between a shoulder 21 on the valve 15 and the other end 22 of the bore 18 which is connected to return. As apparent, the engage valve 15 will remain in that position as long as the solenoid valve 10 is deenergized. Moreover, even when the solenoid valve 10 is initially energized and fluid is supplied to the middle annulus 25 of the engage valve 15, the engage valve 15 remains in engagement with the end 19 of the bore 18 until sufficient fluid pressure has passed through the orifice 26 in the engage valve 15 to the end 19 to overcome the bias of the spring 20, which is long enough to permit sufficient flow to pass through the engage valve 15 and passage 27 into one end 28 of a bore 29 containing a dump valve 30 for moving the dump valve 30 against the bias of a spring 31 to disconnect its middle annulus 32 from the return passage 33. Now, when the engage valve 15 is moved due to fluid pressure buildup in the end 19 of the bore 18 against the bias of the spring 20, the passage 27 is closed off and communication is established between the middle annuli 25 and 32 of the engage valve 15 and dump valve 30 through a connecting passage 35 in the housing 4, and since the middle annulus 32 is no longer connected to return, the incoming fluid pressure is ported through the middle annulus 32 to an electrohydraulic valve 36 via a passage 37.

The passage 27 communicating with the end 28 of the bore 29 containing the dump valve 30 also communicates with a bore 40 containing a failure detection valve 41 via a pair of axially spaced branch passages 42 and 43 and with a chamber 44 containing a dual channel-centering and lockout piston 45. An orifice 46 in the dump valve 30 permits sufficient flow to the end 28 of the bore 29 when the engage valve 15 and dump valve 30 are actuated by fluid pressure as shown in FIG. 1 to make up any minor leakage that might occur in the passage 27, but not sufficient flow to maintain adequate pressure in the end 28 of the bore 29 to hold the dump valve 30 in the actuated position in the event that the passage 27 is connected to return through failure detection valve 41 in a manner to be subsequently fully explained. A pressure switch 38 may be associated with the passage 37 and wired to extinguish a warning light in the pilot's compartment to inform him when this particular channel (Channel A) is properly pressurized as just described.

The other channels B and C also contain dump valves 50 and 51, respectively, which are identical to the dump valve 30 of channel A and are actuated in the same manner to control the flow to electrohydraulic valves 52 and 53 associated therewith upon actuation of the engage valves 16 and 17 as previously described. Moreover, the ends 54 and 55 of the dump valve bores 56 and 57 which are supplied with fluid pressure from the associated engage valves 16 and 17 to actuate the dump valves are communicated with additional failure detection valves 58 and 59 for each of the channels B and C via passages 60 and 61 and branch passages 62, 63, and 64, 65, respectively. The passage 60 also communicates with the chamber 44 containing the dual channel-centering and lockout piston 45 for a purpose which will be fully explained hereafter. Additional pressure switches 70 and 71 may be associated with the passages 72 and 73 between the dump valves 50, 51 and associated electrohydraulic valves 52, 53 for extinguishing a warning light to inform the pilot when the channels B and C are properly pressurized so that the pilot knows when the system is ready to operate on autopilot.

The electrohydraulic valves 36, 52, and 53 are desirably jet pipe valves since they are more tolerant of higher levels of contamination than flapper nozzles or two-stage units and thus more reliable. In any event, their position is controlled by electrical signals which are supplied by the autopilot (not shown) to the valve coils 75 to control the flow of actuating fluid to the associated servorams 76, 77, and 78. The outer ends of the servorams 76 and 77 associated with the channels A and B are desirably directly connected together by an interconnecting link 80 which is in turn connected to the main servovalve plunger 2 and dual tandem main ram 81 of the flight control actuator 3 by a feedback lever 82 and drag links 83 and 84.

The inner ends of the servorams 76 and 77 are contacted by one end of comparator links 86 and 87 pivotally mounted at their centers to the failure detection valves 41 and 58 for the respective channels A and B. The other ends of such comparator links 86 and 87 are received in a yoke 85 carried by the servoram 78 for channel C desirably the same distance from the comparator link pivots 88 and 89 as the servorams 76 and 77. A cross-link 90 is connected to the failure detection valves 41 and 58 for channels A and B at its ends and connected at its middle to the failure detection valve 59 for channel C. Centering springs 91, 92, and 93 normally maintain the failure detection valves 41, 58, and 59 in the positions shown in FIG. 1 and FIG. 2 whereat their respective lands block communication between the associated pressure passages 42, 43; 62, 63; and 64, 65 and return passages 95, 96, and 97.

Movements of the servorams 76, 77, and 78 are detected by linear variable differential transducers 100, 101, and 102, the transducers 100 and 101 being spring-biased into engagement with the comparator links 86 and 87 directly opposite the servorams 76 and 77, and the transducer 102 being spring-biased against the inner end of the servoram 78. Transducer signals generated by core motion during servoram travel are fed back to the electrohydraulic valves 36, 52, and 53 to cancel the electrical inputs that were applied to such electrohydraulic valves by the autopilot, in a manner well known in the art.

Now that the details of construction of the hydrostatic control failure detection device 1 have been set forth, the manner in which such device controls the operation of the flight control actuator 3 under both normal operating conditions and conditions in which a failure has occurred in one or more of the fluid channels A, B, and C will be described.

NORMAL OPERATION

When all of the solenoid valves 10, 11, and 12 have been energized and the pressure switches 38, 70, and 71 have extinguished the various warning lights to let the pilot know that all of the fluid channels A, B, and C are properly pressurized, the pilot may actuate the autopilot system to take over the control of the aircraft. Actuation of the autopilot under normal operating conditions will cause the autopilot to apply three identical electrical inputs to the electrohydraulic valves 36, 52, and 53, thus to hydraulically drive the three servorams 76, 77, and 78 in unison at the same velocity and amplitude, the only difference being that the servoram 78 is ported so that its motion is 180° degrees out of phase with the other two servorams 76 and 77. Thus, when servorams 76 and 77 are extending, servoram 78 will be retracting at an identical rate and vice versa.

The resultant output stroke of the servorams 76 and 77 is summed by the interconnecting link 80 and transmitted to the main servovalve plunger 2 through the feedback lever 82 and drag links 83, 34, and ideally corresponds exactly to the output stroke of each of the servorams. Such movements of the main servovalve plunger 2 control the flow of fluid pressure from each of the pressure ports $P_A$ and $P_B$ to opposite ends of the various chambers 109 and 110 associated with the dual tandem main servoram 81 to drive the main servoram 81 in one direction or the other. The resulting main ram 81 motion drives the flight control surface (not shown) while moving the feedback lever 82 attached thereto in a direction driving the main servovalve plunger 2 back to its neutral or shutoff position after the desired output position has been reached. At that time the electrical inputs that were supplied to the electrohydraulic valves 36, 52, and 53 are canceled by the feedback signals from the linear variable differential transducers 100, 101, and 102 as previously described.

As readily apparent, so long as identical electrical inputs are applied to the electrohydraulic valves 36, 52, and 53 to drive the servorams 76, 77, and 78 in unison, the comparator links 86 and 87 through which the servorams 76, 77, and 78 are interconnected will rotate about their respective pivot points 88 and 89 without imparting any significant forces to the detection valves 41 and 58. However, should one of the electrohydraulic valves drift out of phase or due to an electrical failure start to drive its servoram hard over, the failure will be detected and that servoram made inoperative so as not to interfere with control of the movements of the main servovalve, as described hereafter.

FIRST FAILURE

If for any reason the excursion of one of the servorams 76 or 77 of channel A or B are not compatible in both magnitude and direction with the other servorams, the associated detection valve 41 or 58 will be moved in one direction or the other by its associated comparator link 86 or 87 against its centering spring cartridge 91 or 92 thus to uncover one or the other of the branch passages 42, 43 or 62, 63 and vent the end of the associated dump valve 30 or 50 to the return passage 95 or 96. The loss in pressure at the end of the dump valve 30 or 50 will permit the associated dump valve spring 31 to shuttle the dump valve to a position venting the associated electrohydraulic valve 36 or 52 and pressure switch 38 or 70 to such return passage 95 or 96 through its middle annulus 32. However, the associated engage valve 15 or 16 will not be affected by such deactivation of the associated dump valve 30 or 50; it will remain in the actuated position shown in FIG. 1.

With the failed electrohydraulic valve 36 or 52 at return pressure, movements of the associated servoram 76 or 77 will be controlled by the remaining operating channels through the comparator link 86 or 87 and the associated detection valve 41 or 58 will be recentered by its spring cartridge 91 or 92. Thus, the movements of the remaining two active servorams will drive the servoram in the failed channel with the fluid from the failed servoram being bypassed through the inoperative electrohydraulic valve 36 or 52, whereby there will be no deterioration of gain, response, or output force due to the failure of one of the channels A or B. However, the loss of pressure at the pressure switch 38 or 70 associated with the failed channel will turn on a light or produce a signal in the pilot's compartment to inform the pilot that that particular channel has failed.

If on the other hand the failure originates in the electrohydraulic valve 53 associated with the monitor channel C, the servorams 76 and 77 associated with channels A and B will cycle in a direction or amplitude which does not agree with the monitor servoram 78 excursions. In that event, a resultant force will be applied at the pivot points 88 and 89 of both comparator links 86 and 87, causing a translatory motion of the cross-link 90 which connects all three detection valves 41, 58, and 59 together, whereby all three detection valves will overcome their associated spring-centering cartridges and move in the direction of the applied force as shown in phantom lines in FIG. 2. However, the monitor detection valve 59 desirably overlaps its branch passages 64, 65 to a lesser extent, preferably only about 75 percent as much overlap as between the detection valves 41 and 58 and their associated branch passages 42, 43, and 62, 63, whereby the monitor dump valve 51 and the electrohydraulic valve 53 for monitor channel C will be vented to return pressure thus permitting the failure detection valves 41, 58, and 59 to be returned to their center positions by their associated centering springs before the channels A and B are vented. Accordingly, the channel A and B servorams 76 and 77 will resume normal cycling, driving the failed monitor channel servoram 78 through identical excursions by forcing the exhausting fluid from the failed servoram 78 through the failed electrohydraulic valve 53. Thus, the failure in the monitor channel C will not produce any change in unit gain, response, or output, and the remaining two channels A and B will still monitor each other through the comparator links 86 and 87.

In each case after a fluid channel has failed, the pilot can reactivate the failed channel simply by deenergizing the solenoid valve 10, 11, or 12 for the failed channel to vent the pressurized end of the associated engage valve 15, 16, or 17 to return through the engage valve orifice and associated solenoid valve so that the engage valve spring can shuttle the engage valve to its deactivated position, and then reenergize the same solenoid to pressurize the failed channel as previously described. If the failure was transient or has corrected itself in some manner, the pressure switch light associated therewith will go off and stay off. However, if the failure is still present, the channel will again be rejected as previously described and the pressure switch light will come back on.

Another type of failure that can occur is loss of hydraulic pressure at either of the pressure ports $P_A$ or $P_B$ due to pump failure or a broken hydraulic line, for example. If such a failure occurs in channel A, the engage and dump valves 15 and 30 for that channel will react in the same manner as when the associated detection valve 41 produces the reduced pressure, and the remaining channels B and C will still operate the unit as before. A bypass valve 115 associated with the passage 116 leading from the pressure port $P_A$ to the flight control actuator 3 will be moved out of the position shown in FIG. 1 by the spring 117 upon such loss in pressure to permit free flow through the bypass valve 115 from one end of the main servoram chamber 118 to the other thus to permit continued actuation of the main servoram 81 by the fluid pressure supplied to the flight control actuator 3 from the other pressure port $P_B$ via passage 119, but the output force will be reduced by one-half. A similar bypass valve 120 is provided for permitting free flow between the ends of the other main servoram chamber 121 in the event of failure in pressure at the pressure port $P_B$.

If instead of a failure in the pressure at port $P_A$, there is a failure in the pressure at port $P_B$, channel A will remain pressurized, but both channel B and channel C will be lost since both are pressurized by the same port, and accordingly the device would still operate properly on channel A, although the main ram output force will again be reduced by one-half. Of course, if a third hydraulic system were provided for the monitor channel C, the device could then tolerate a single hydraulic failure with no degradation in performance, since the present system is truly triple redundant, utilizing three functional channels.

SECOND FAILURE

When there is a failure in one of the channels such as channel A which leaves it inoperative, the servorams 77 and 78 in the other two channels B and C will still drive the output. However, if the channel C servoram 78 were now driven hard over due to a failure in its electrohydraulic valve 53, the failure detection valves 58 and 59 would begin to move, with the detection valve 58 in channel B moving twice as fan as detection valve 59 in channel C due to the linkage geometry. Since the overlap by the detection valve 59 of its branch passages 64, 65 is only 75 percent that of the overlap of the detection valve 58 with its branch passages 62, 63, the greater movement of the detection valve 58 for channel B will vent its associated dump valve 50 to return pressure and depressurize that channel first.

The earlier failure in channel A had already depressurized the passage 27 leading to the centering lock chamber 44 and this second failure of channel B depressurized the passage 60 leading to such chamber 44, whereby the centering lock spring 125 is now free to drive the tapered forward end 126 of the centering lock piston 45 against the tapered annular groove 127 on the monitor servoram 78 thus to force such servoram to its centered position which through the comparator links 86 and 87 centers both channel A and channel B servorams 76 and 77. As a result, the main servovalve plunger 2 will be moved to its neutral position through connecting links 80, 82, 83, and 84 to hydraulically center the main ram 81.

The pilot may, by carefully deenergizing and reenergizing solenoid valves 11 and 12, test both channels B and C to determine which one is actually failed. When he discovers that the failure was in monitor channel C he can reactivate channel B and safely operate the main servovalve plunger 2 with the remaining channel at some reduction in unit performance.

If the first failure is in the monitor channel C, a second failure in either channel A or B will produce equal displacement of detection valves 41 and 58, whereby both channels A and B will be depressurized. Again, the centering lock piston 45 will center the servorams 76, 77 and 78, linkage, main servovalve 2, and main output ram 81. However, testing of the channels as previously described will locate the failed channel and the properly operating channel can be reactivated to operate the unit as before.

Should fluid pressure be lost at both pressure ports $P_A$ and $P_B$, the unit would be completely unpressurized, in which event the bypass valves 115 and 120 associated with the pressure passages 116 and 119 would be free to move under the force of their respective springs to a position permitting free flow of fluid between opposite ends of the dual tandem chambers 118 and 121. Under these circumstances, the centering lock piston 45 would not be effective in centering the main ram 81; a mechanical backup of suitable type would have to be provided for that purpose. Otherwise, such a failure of both hydraulic systems, although quite unusual, would likely be catastrophic. Of course, if two or more of such hydraulic control failure detection devices 1 were utilized for driving a single control surface, safe operation would be still possible after total loss of one device.

DESIGN MODIFICATIONS

Figure 2:
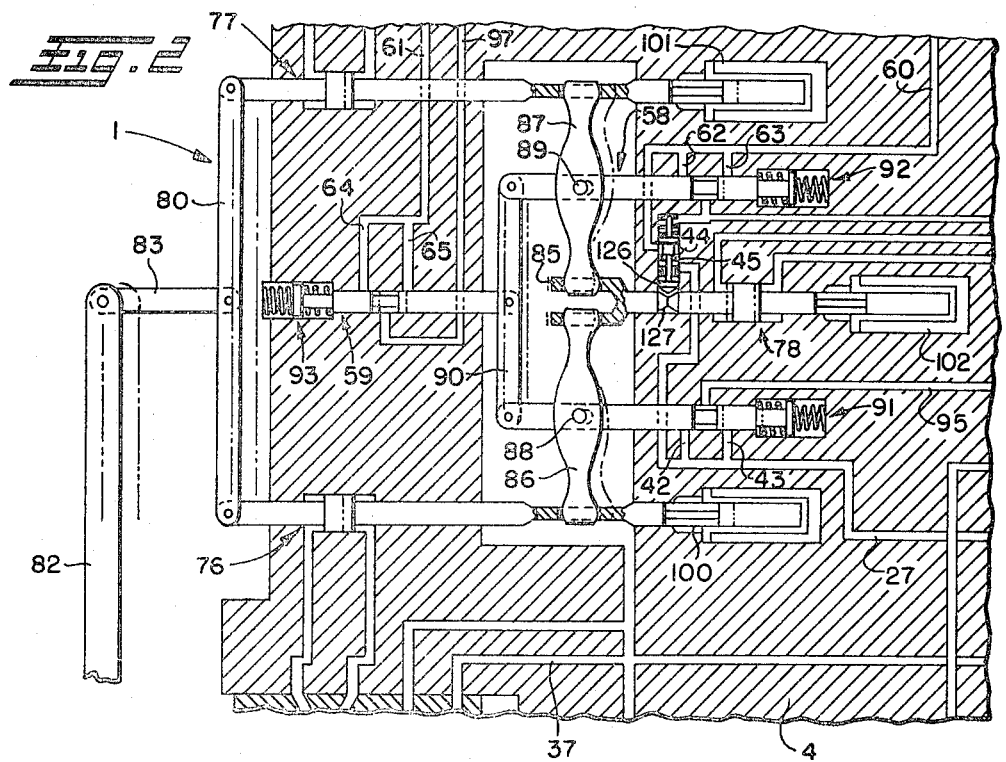
FIG. 2 is an enlarged fragmentary schematic diagram showing the manner in which the servorams and failure detection devices are compared and monitored by control links.
Figure 3:
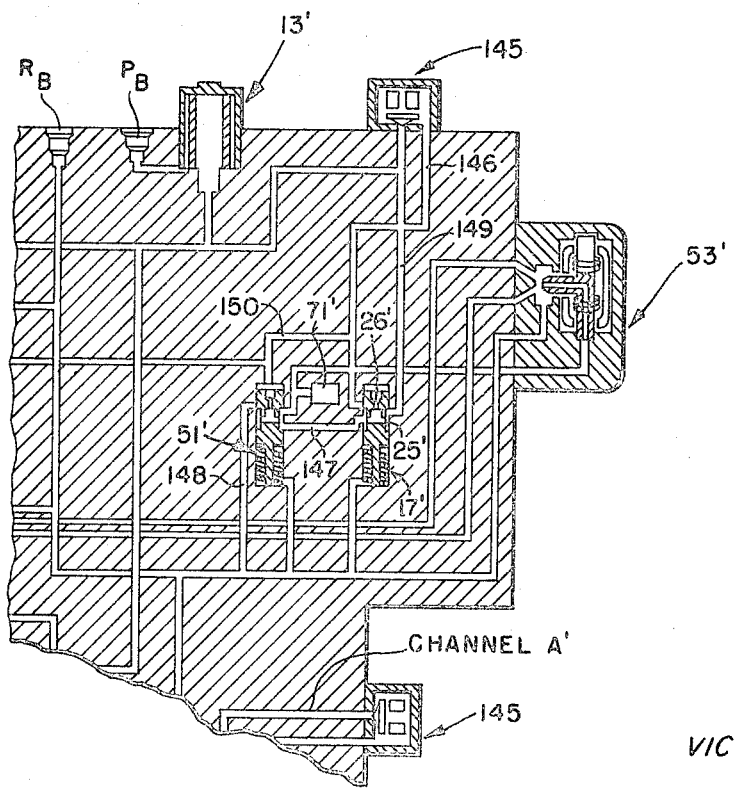
FIG. 3 is a fragmentary schematic diagram showing a slightly modified form of hydrostatic control failure detection device in accordance with this invention.

One drawback of the hydraulic control failure detection device 1 described above is that should there be a failure in any of the solenoid valves 10, 11, or 12, the particular channel associated with the failed solenoid valve will be dumped to return, thus deactivating the entire channel. This would not be the case, however, if instead of the on–off solenoid valves 10, 11, and 12 of FIGS. 1 and 2, pulse-type solenoid valves 145 were substituted therefor and opposite sides of the solenoid valves were connected to the associated engage valves as such as shown in FIG. 3. In that event, with the solenoid valves 145 deenergized prior to actuation of the associated channels, fluid will be permitted to flow as, for example, through the solenoid valve 145 of channel C and associated engage and dump valves 17' and 51' to return via passages 146, 147, and 148. When initially energized, the solenoid valve 145 closes off such flow through passage 146, thus permitting fluid flow through the branch passage 149 first to actuate the dump valve 51' via the mid annulus 25' of engage valve 17' and passages 146 and 150, and then actuate the engage valve 17' due to pressure buildup through the orifice 26'. Now, should the solenoid valve 145 fail and permit fluid flow through the passage 146, the channel will still remain active so long as the dump valve 51' is not connected to return through the associated failure detection valve. Otherwise, the construction and operation of the modified form of device 1' shown in FIG. 3 are substantially the same as that illustrated in FIGS. 1 and 2. The flow passages between the solenoid valves and associated engage and dump valves for the other channels A and B are identical and accordingly each one need not be discussed in detail. The same numerals followed by a prime symbol are used to designate like parts.

To minimize the effects of hydraulic system failures, a second monitor channel D identical to monitor channel C may also be added to the device as shown in FIG. 4 which could operate on the channel A' fluid system. A system transfer valve 150 in the device would allow only monitor channel C' to be in the system until there was a loss in fluid pressure in that channel, in which event the pressure in the other monitor channel D acting on one end of the system transfer valve 150 would overcome the bias of the spring 151 and move such system transfer valve to a position-switching monitor channel D into the system and taking monitor channel C' out of the system. Of course, a dual servoram 152 must be provided for actuation by one or the other of the monitor electrohydraulic valves 152 or 52' and a dual tandem detection valve 59' must likewise be provided for venting one or the other of the monitor channels C' and D. Otherwise, the operation is substantially the same, but the flow passages may be somewhat different.

Moreover, the mechanical linkages which interconnect the various servorams with each other and with the failure detection valves may be somewhat different than that shown in FIG. 1, but the mode of operation is still the same. Thus, for example, comparator links 160 and 161 may interconnect the servorams 76', 77' and 152 outwardly of the housing 4', pivoted intermediate their lengths to the outer ends of the detection valves 41' and 58'. Such detection valves 41' and 58' are yieldably maintained in the position shown in FIG. 4 blocking flow to return by associated spring-centering mechanisms 91' and 92', and their inner ends are connected to the monitor channel detection valve 59' by a crosslink 90' pivotally attached to such monitor detection valve intermediate its length. Outwardly of the comparator links 160 and 161 is a summing link 162 which transmits the outputs of the servorams 76' and 77' to an input lever 163 through a drag link 164.

One end of the input lever 163 may be pivotally connected to a series mode lockout mechanism 165 which in the form shown comprises a link 166 pivoted to the valve housing 4' intermediate its ends, one end being connected to the input lever 163 by a rod 167, and the other end being connected to a decentering cylinder 168 by a rod 169. A pivotally mounted backup lever 170 is yieldably urged into engagement with the outer end 171 of the link 166 by a spring cartridge 172 so that the connection between the input lever 163 and link 166 will act as a fixed point about which the input lever 163 pivots in response to movements of the summing link 162, thus to effect movements of the main servovalve plunger 2' through the connecting link 175 and feedback link 176. However, if for any reason it becomes necessary or desirable for the pilot to take over control of the aircraft during autopilot operation, he may do so simply by moving the manual input link 177 attached to the opposite end of the input lever 163 to move the input lever 163 about its connection with the summing link 162 against the bias of the spring 172 of the series mode lockout mechanism 165. Such manual input override can be precluded only by actuating a series mode engage solenoid 180 to supply fluid pressure for locking the decentering cylinder 168 against movement.

From the above discussion, it can now be seen that each of the various forms of hydraulic control failure detection devices disclosed herein is of a relatively simple construction, embodying three or more electrohydraulic valves and their associated servorams, transducers, and linkages to provide the desired output. Comparator links, detection valves, and pressure switches compare these outputs and identify failures when they occur, thus to permit venting of the failed channel without interrupting the control movements. The failed channels may be recycled through dump valves, engage valves, and solenoids to ascertain their true condition.

Although each of the disclosed control devices are shown connected to a main servovalve for driving the same, it will be apparent that for applications where output forces and strokes are relatively small in magnitude, the main servovalve and main ram could be eliminated and the summed output of the three servorams could be used to drive the load directly. The output could also be converted to rotary or other such motion, as desired.

Moreover, although the present invention is primarily designed for multiredundant control of flight control surfaces or the like, it will be apparent that the same principles are readily adaptable to all types of servocontrol units. Any unit that provides either a linear or rotary output in response to electrical, manual, or a combination of electrical and manual inputs can be made to utilize this construction.

I claim:

1. A hydrostatic control failure detection device comprising: three servorams; valve means for supplying fluid pressure to actuate said servorams; link means interconnecting said servorams for movement of said link means in response to the movements of said servorams to detect variations in the movements of said servorams; and vent means for each of said valve means selectively actuated by said link means in response to variations in the movements of any one of said servorams as compared to the other servorams to vent the valve means associated with the servoram whose movements do not properly correspond to the movements of the other servorams, said other servorams being operative to control the movements of said servoram associated with said vented valve means through said link means.

2. The device of claim 1 wherein said vent means comprise failure detection valves having spring means normally maintaining said failure detection valves in a position blocking vent passages for said valve means, said link means being pivotally mounted on said failure detection valves, whereby translatory movements of said link means will cause axial movements of said failure detection valves for venting said valve means as aforesaid.

3. The device of claim 2 wherein one of said failure detection valves vents its associated valve means with less movement than said other failure detection valves, thus to permit said spring means to return the other failure detection valves to center position before venting for continued operation by said other servorams.

4. The device of claim 1 further comprising a dump valve associated with each of said valve means, and engage valves for supplying fluid pressure to said dump valves to move said dump valves to active positions supplying fluid pressure to said valve means, said vent means being operative to vent the dump valve associated with the servoram whose movements do not agree with the movements of said other servorams, said dump valve when vented moving to an inoperative position blocking fluid flow to its associated valve means.

5. The device of claim 4 further comprising solenoid valve means for controlling the flow of fluid pressure to said engage valves.

6. The device of claim 4 further comprising pulse-type solenoid valves for providing fluid flow to said engage valves.

7. The device of claim 1 wherein said link means are further operative to monitor the movements of said other servorams after venting of one of said valve means.

8. The device of claim 7 further comprising means for centering one of said servorams after venting of two of said valve means to center all of said servorams through said link means.

9. The device of claim 1 further comprising two separate fluid circuits, one for supplying fluid pressure to one of said valve means, and the other for supplying fluid pressure to two of said valve means, whereby should a pressure failure occur in one of said fluid circuits, the other fluid circuit will still supply sufficient fluid pressure to operate said device.

10. The device of claim 1 further comprising an additional valve means for controlling the flow of fluid to one of said servorams, and bypass means for supplying fluid pressure to said additional valve means in the event that the valve means associated with said one servoram is vented.

11. The device of claim 1 further comprising an output lever connected to two of said servorams, and mechanical link means operatively connected to said output lever to permit overriding of the movements of said output lever by said servorams.

12. The device of claim 1 wherein said valve means are electrohydraulic valves to which electrical inputs are supplied to control fluid flow therethrough, and linear variable differential transducers are associated with said servorams to generate signals proportional to servoram travel and feed such signals back to said electrohydraulic valves to offset such electrical inputs.

13. A hydrostatic control failure detection device comprising: at least three servorams; at least three fluid channels, one for each servoram; valve means in each fluid channel for supplying fluid pressure to actuate said servorams; link means interconnecting said servorams for movement of said link means in response to the movements of said servorams to detect variations in the movements of said servorams; and vent means for each of said valve means selectively actuated by said link means in response to variations in the movements of any one of said servorams as compared to the other servorams to vent the valve means associated with the servoram whose movements do not agree with the movements of the other servorams, said other servorams being operative to control the movements of the servoram associated with the vented valve means through said link means.

14. The device of claim 13 further comprising at least two fluid circuits for supplying fluid pressure to said three channels, whereby should there be a pressure failure in one of said fluid circuits, the other fluid circuit will still be able to supply sufficient fluid pressure to operate said device.

15. The device of claim 13 further comprising an additional fluid channel containing an additional valve means for controlling the flow of fluid to one of said servorams, and bypass means for supplying fluid pressure to said additional valve means in the event that the valve means associated with said one of said servorams is vented.

16. The device of claim 13 wherein each of said fluid channels also includes a dump valve associated with each of said valve means, and engage valves which when supplied with fluid pressure cause said dump valves to move to an active position supplying fluid pressure to said valve means, said vent means being operative to vent the dump valve associated with the servoram whose movements do not agree with the movements of said other servorams, said dump valve when vented moving to an inoperative position blocking fluid flow to its associated valve means.